(12) United States Patent
Driesen et al.

(10) Patent No.: US 8,924,384 B2
(45) Date of Patent: Dec. 30, 2014

(54) UPGRADING COLUMN-BASED DATABASES

(75) Inventors: Volker Driesen, Walldorf (DE); Peter Eberlein, Malsch (DE)

(73) Assignee: SAP AG, Walldorf (DE)

( * ) Notice: Subject to any disclaimer, the term of this patent is extended or adjusted under 35 U.S.C. 154(b) by 529 days.

(21) Appl. No.: 12/850,543

(22) Filed: Aug. 4, 2010

(65) Prior Publication Data

US 2012/0036165 A1     Feb. 9, 2012

(51) Int. Cl.
*G06F 17/30*     (2006.01)

(52) U.S. Cl.
CPC .... *G06F 17/30286* (2013.01); *G06F 17/30306* (2013.01)
USPC ........... 707/736; 707/703; 707/758; 707/769; 707/781; 707/791; 707/792; 707/793; 707/797; 707/801; 707/802

(58) Field of Classification Search
USPC ......... 707/703, 736, 758, 769, 781, 791–793, 707/797, 801, 802, 999.1, 999.001
See application file for complete search history.

(56) References Cited

U.S. PATENT DOCUMENTS

| | | | | |
|---|---|---|---|---|
| 5,897,632 A * | 4/1999 | Dar et al. | | 1/1 |
| 5,926,816 A * | 7/1999 | Bauer et al. | | 1/1 |
| 6,594,653 B2 * | 7/2003 | Colby et al. | | 1/1 |
| 7,991,798 B2 * | 8/2011 | Arora | | 707/803 |
| 2001/0051949 A1 * | 12/2001 | Carey et al. | | 707/103 R |
| 2004/0022379 A1 * | 2/2004 | Klos et al. | | 379/201.01 |
| 2005/0102326 A1 * | 5/2005 | Peleg et al. | | 707/200 |
| 2007/0282515 A1 * | 12/2007 | Arora | | 701/101 |
| 2008/0098046 A1 * | 4/2008 | Alpern et al. | | 707/203 |
| 2008/0208806 A1 * | 8/2008 | Dalfo et al. | | 707/3 |
| 2009/0094194 A1 * | 4/2009 | Gupta | | 707/2 |
| 2010/0235335 A1 * | 9/2010 | Heman et al. | | 707/703 |
| 2012/0041988 A1 * | 2/2012 | Driesen | | 707/803 |

OTHER PUBLICATIONS

Grund et al., "Vertical partioning in insert-only scenarios for enterprise applications", 16th International Conferene on Industrial Engineering and Engineering Management, 2009.

Choy, et al., "A distributed catalog for heterogeneous distributed database resources", Proceedings of the First International Conference on Parallel and Distributed Information Systems, 2009.

* cited by examiner

*Primary Examiner* — Syling Yen
(74) *Attorney, Agent, or Firm* — Mintz Levin Cohn Ferris Glovsky and Popeo, P.C.

(57) ABSTRACT

Techniques are described in which at least one column is added to a table in a column-based database that has a plurality of columns and table fields. A shadow-in-place upgrade of the column-based database can be performed that adds at least one new column to the database. Thereafter, access to the column-based database can be seamlessly enabled before, during, and after the upgrade through a plurality of views. The views define a subset of the fields in the database that are visible. Related apparatus, systems, techniques and articles are also described.

20 Claims, 5 Drawing Sheets

UPGRADING COLUMN-BASED DATABASES

TECHNICAL FIELD

The subject matter described herein relates to techniques for upgrading column-based databases.

BACKGROUND

Upgrade procedures for enterprise software systems are largely dependent on the way the underlying databases are organized (e.g., row based vs. column based, etc.) and how data is stored (CRUD or "insert only"). Conventional upgrade procedures are typically designed for standard, row oriented databases and are not suitable for column-based databases with an insert only approach.

SUMMARY

In one aspect, access to a column-based database having a plurality of columns is enabled using a first view of a table. The first view of the table defines a first set of table fields that encapsulates data within the table that is available for access. The table is then modified to include at least one shadow column that is not included in the first set of table fields so that at least a portion of the data encapsulated in the first set of table fields can be migrated to the at least one shadow column. Thereafter, a second view of the table is generated that defines a second set of table fields encapsulating data within the table that is available for access. The second set of table fields includes table fields in the at least one shadow column from which data from the first set of table fields was migrated. Subsequently, access to the database is enabled using the second view of the table.

The following describes optional variations that can be implemented singly or in combination. The second view of the table fields can exclude table fields from which data was migrated. The database can be an insert-only database. The table can comprise a plurality of entries each having a timestamp. Migrating at least a portion of the data encapsulated in the first set of table fields can include initiating a procedure to iteratively advance through the entries in the table corresponding to the migrated data in a chronological order as specified by the corresponding timestamp and computing, for each such entry, data to a field in the at least one shadow column based on data in a field in the first set of fields. Such procedure can remain active until deleted or suspended. The procedure can advance through new entries within the first view in the table automatically upon the generation of each new entry.

The table can comprise a main data area, a delta data area, and an upgrade delta area such that the procedure only advances through entries in the main data area and the delta data area. The main data area can comprise data entries up to a first timestamp and the delta data area can comprise data entries having timestamps subsequent to the first timestamp. The upgrade delta area can comprise entries written by the procedure. The delta data area can be first merged into the main data area and the upgrade delta area can be later merged into the main data area. The entries written by the procedure in the upgrade delta area can be assigned timestamps that include an offset so that such entries have timestamps more recent than timestamps of entries in the delta data area. At least one shadow column can be used to broaden a column within the first view of the table to include at least one additional character.

In another aspect, at least one column is added to a table in a column-based database that has a plurality of columns and table fields. A shadow-in-place upgrade of the column-based database can be performed that adds at least one new column to the database. Thereafter, access to the column-based database can be seamlessly enabled before, during, and after the upgrade through a plurality of views. The views define a subset of the fields in the database that are visible.

Articles of manufacture are also described that comprise computer executable instructions permanently stored (e.g., non-transitorily stored, etc.) on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein.

The subject matter described herein provides many advantages. For example, the current subject matter enables a shadow-in-place upgrade with the advantages of both an in-place upgrade and a shadow upgrade. In-place upgrade, in this regard, refers to changing only those parts and data entries that are required to be changed. The overhead in copying data to a shadow can be eliminated, required additional data volume is smaller, and required updates are minimized. Shadow upgrade in this regard enables preparation of a new version invisible to the currently running applications and allows for the new version to be "switched on" very quickly, thereby dramatically reducing downtime.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements

DETAILED DESCRIPTION

Figure 1:
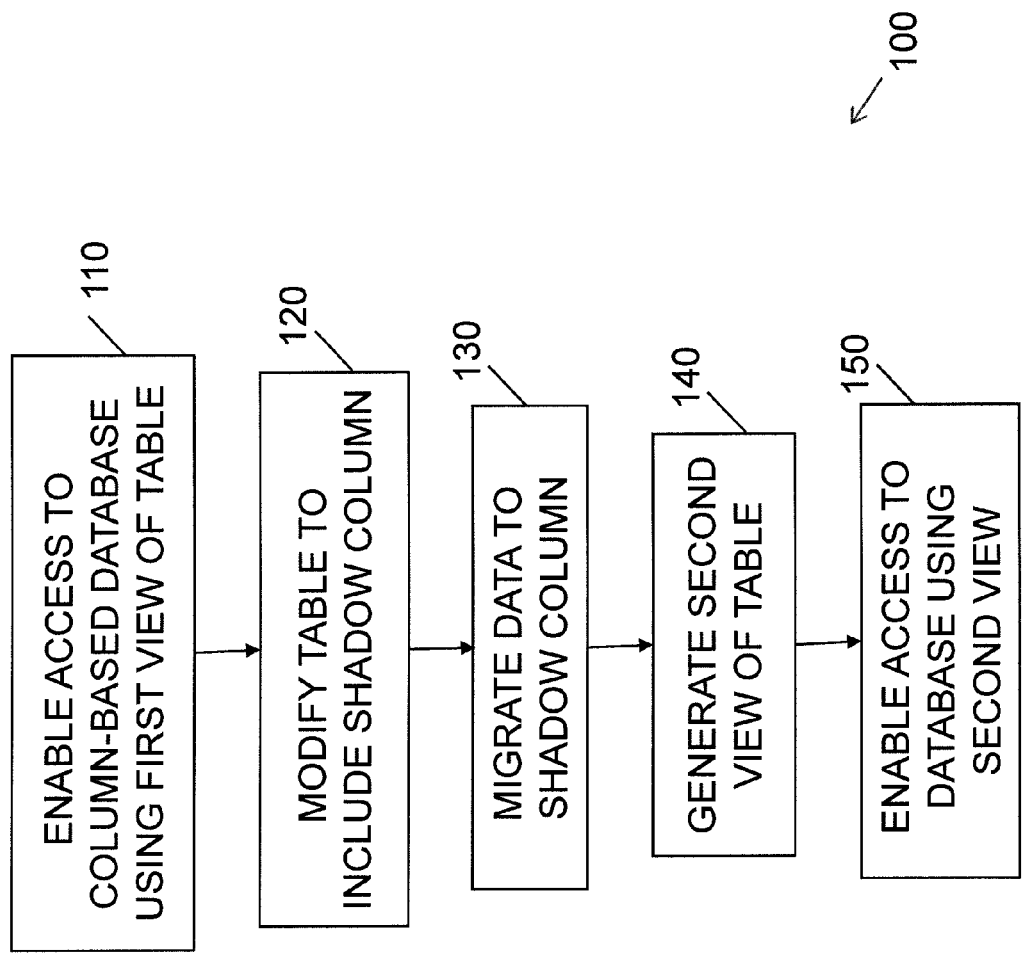
FIG. 1 is a process flow diagram illustrating a method of upgrading a column-based database.

FIG. 1 is a processing flow diagram illustrating a method 100 in which, at 110, access to a column-based database having a plurality of columns is enabled using a first view of a table. The first view of the table defines a first set of table fields that encapsulates data within the table that is available for access. The table is then, at 120, modified to include at least one shadow column that is not included in the first set of table fields so that, at 130, at least a portion of the data encapsulated in the first set of table fields can be migrated to the at least one shadow column. Thereafter, at 140, a second view of the table is generated that defines a second set of table fields encapsulating data within the table that is available for access. The second set of table fields includes table fields in the at least one shadow column from which data from the first set of table fields was migrated. Subsequently, at 150, access to the database is enabled using the second view of the table.

The following provides a high level overview of major steps required in an upgrade of a column based database. Initially, by use of a database view, a running application can operate on tables of a database (even if such tables are changed). Thereafter, the database structure can be prepared for new release by adding new columns (also referred to as shadow columns below). Data can then be migrated from pre-existing columns to the shadow columns. In some implementations, a shadow delta space can be implemented and the upgrade software can be deployed to this shadow delta space. New database views can be created that allow access to at least a portion of the shadow columns. During downtime, the deltas can be merged and the database structure can be finalized.

The upgrade procedure of column oriented insert-only databases according to the current subject matter allows for (a) defining shadow database catalogs with views on a table to extend the table at runtime by additional columns; (b) defining a stored procedure that can convert data in a table during productive use of the table, including converting data, which is inserted during the operation of the procedure; and (c) a delta content space dedicated for upgrade data import which in turn allows importing data at uptime. This delta content space can be merged to the main data space during downtime.

Figure 2:
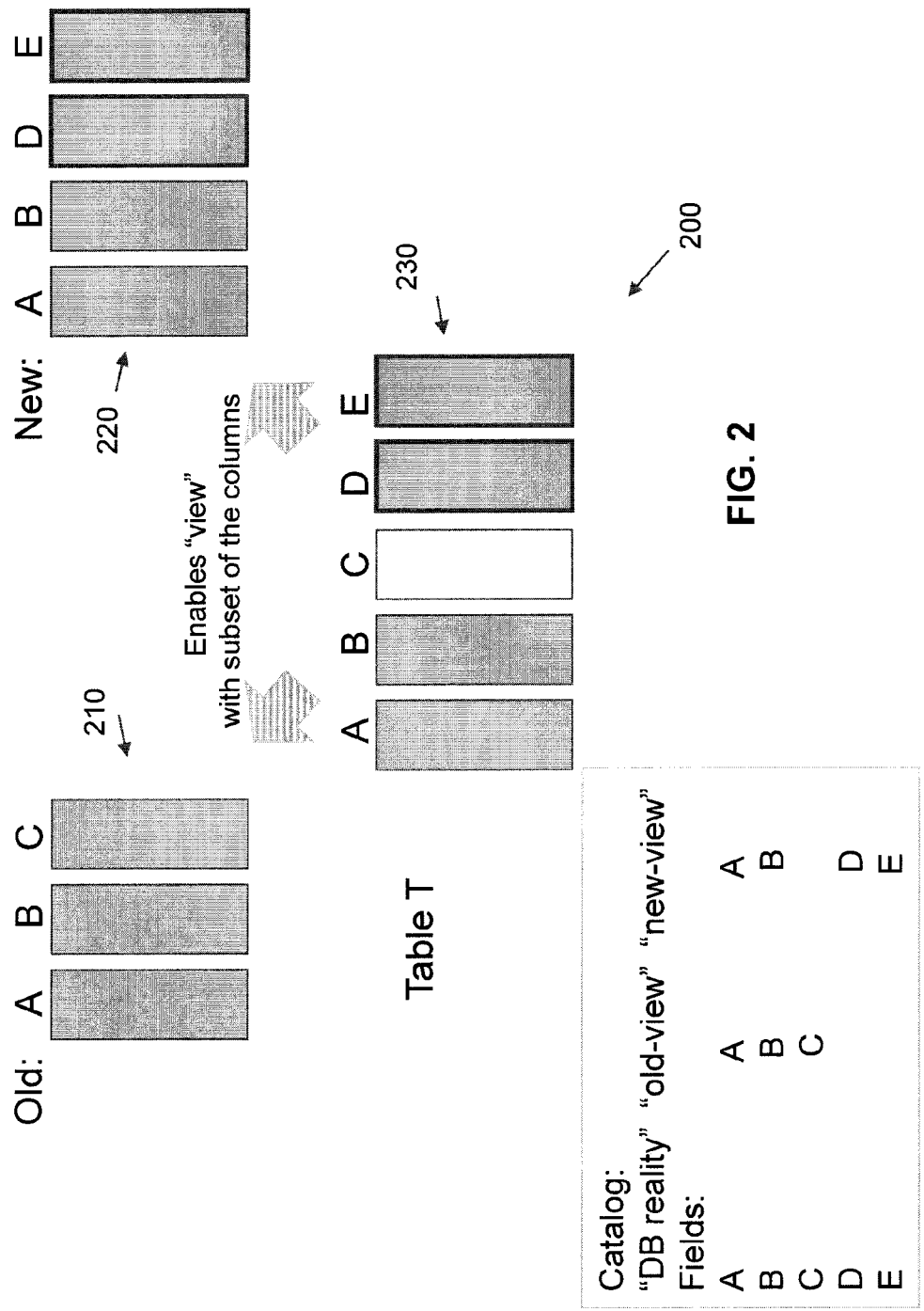
FIG. 2 is a diagram illustrating views on a database table.

FIG. 2 is a diagram illustrating a table layout 200 that includes an old view 210 with columns A, B, C, a table T 230 (i.e., the actual table) with columns A, B, C, D, E and a new view 220 with columns A, B, D, E. The database enables defining a "view" 230 (not the current database view) of the table T 230, which is used by the software instead of the original table 230. The new view 230 defines that only a subset of the table fields is visible (in this case columns A, B, D, E as opposed to all of the columns in the table 230), and the fields in the view may be called differently than the fields in the table T 230.

Figure 3:
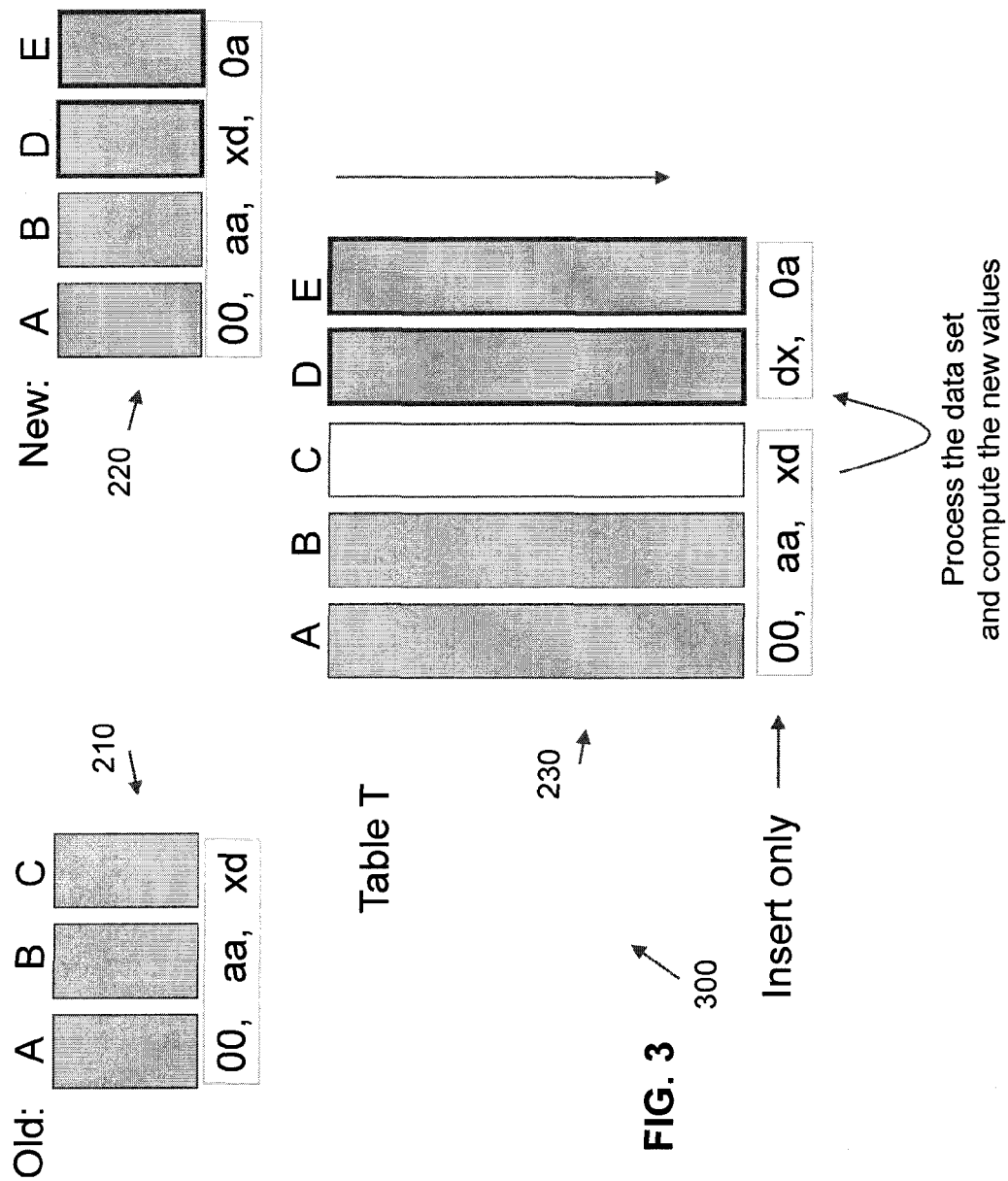
FIG. 3 is a diagram illustrating views on the database table of FIG. 2 while such table is being updated.

As used herein, queued conversion stored procedures is a module which can run through all content in a table (e.g., table T 230, etc.) and compute values for new columns out of the values of old columns. In addition, the queued conversion stored procedure can proceed concurrently when new data is being entered to table T 230. With reference to the diagram 300 of FIG. 3, using the "insert-only" paradigm and the structure of tables having a time-stamp, the processing of table T 230 can be performed on a temporal basis, starting with the "old" entries (i.e., entries having an earlier timestamp, etc.). Once the queued conversion stored procedure is finished with all the entries in table T 230, it remains active and "listening" for new entries (see last insert-only entry in table T 230). When a new entry is entered, this new entry is inserted with the latest time-stamp. The procedure thus does not require an identification of the inserted key (e.g., by a trigger and an "updated-flag-column") because the latest inserted rows have the latest timestamp. This approach can be used to define incremental conversion and migration procedures.

Figure 5:
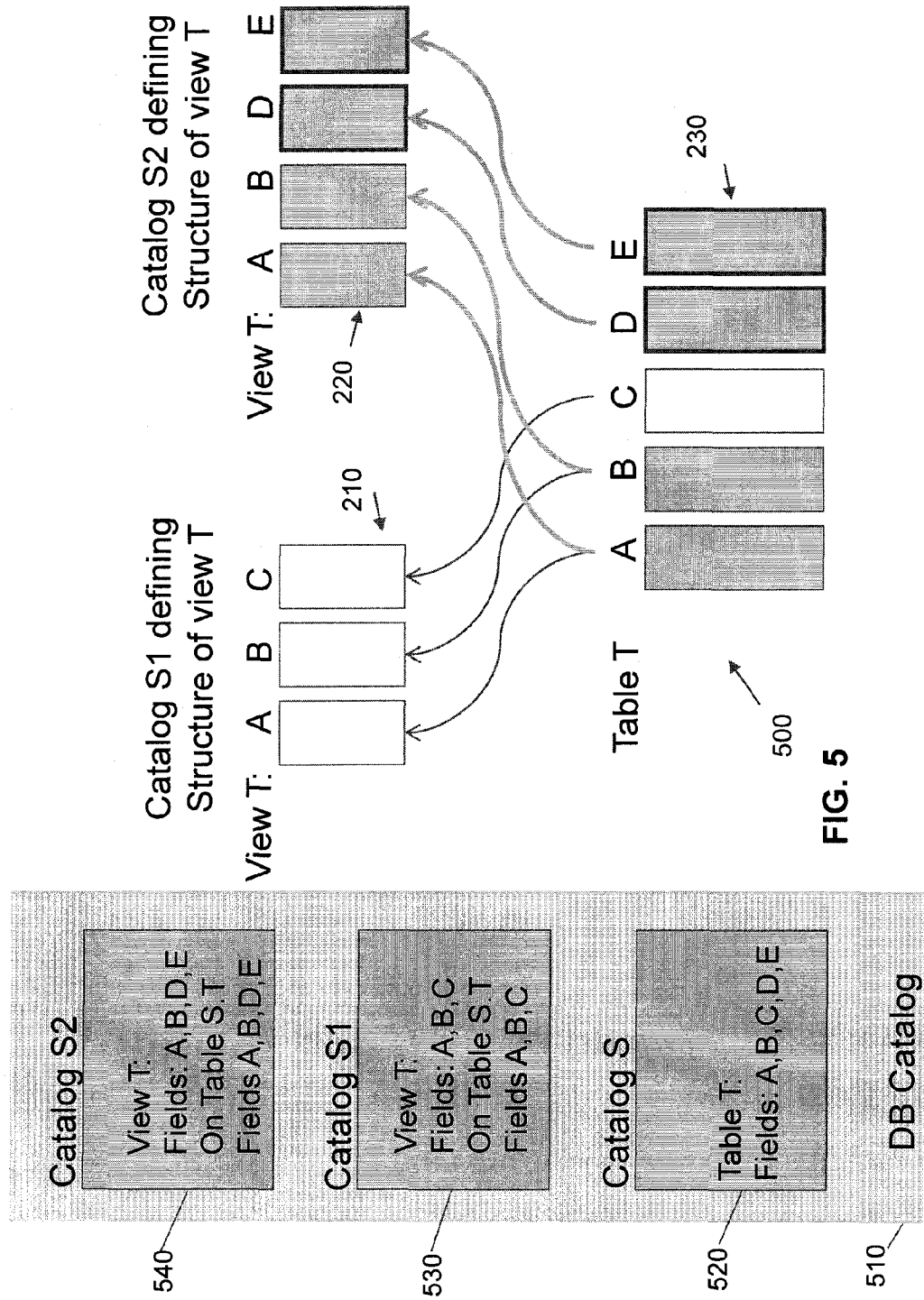
FIG. 5 is a diagram illustrating a database catalog specifying contexts for accessing the views of FIG. 2.

As an example, the queued conversion stored procedure can be running in DB catalog S (see 510 in FIG. 5). The procedure can iterate through entries in table T 230 by date starting with the oldest. The entry can be processed, updated and the next entry can be taken. For each entry, data is read, the new field values are computed and updated (e.g., D=f(A, B, C)). The procedure can remain active until deleted or suspended and upon new entries being added to table T 230, the procedure also computes corresponding new values.

Figure 4:
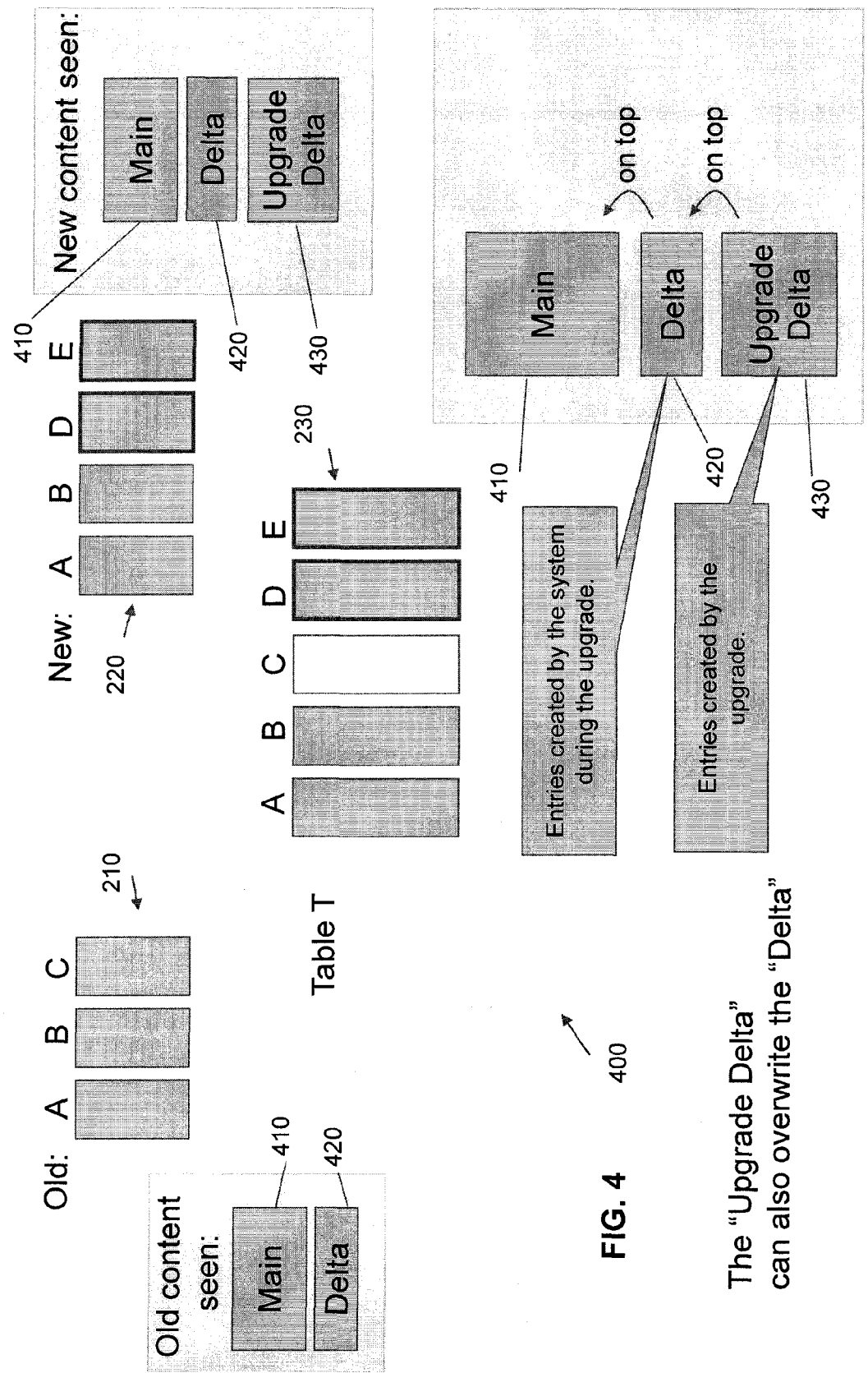
FIG. 4 is a diagram illustrating data storage areas associated with each view of FIG. 2.

FIG. 4 is a diagram 400 that illustrates three data areas that can be used by table T 230, a main data area 410, a delta data area 420, and an upgrade delta data area 430. To ensure that no data inserted with the new structure is processed as well, the stored procedure can be configured to only operate through the main data area 410 and the delta data area 420, not the upgrade delta area 430. During a merge of the delta data area 420 into the main data area 410, the stored procedure can be suspended.

The stored procedure can act to replace two programs which would be used in conventional approaches, namely a database trigger and a batch program running through all entries and processing them. This combination of a trigger and a batch program faces synchronization problems. Upon a new entry, the database trigger will be called. Upon its loop over the table, also the batch program will process the new entry and now would have to identify, that this entry had already been processed by a trigger and no further action is required.

During an upgrade, the new software and new content is deployed to the database (in arrangements in which application software is also stored in the database). To enable that the deployment of data can be done in parallel to productive use of the "old" data, a shadow approach can be adopted.

According to the current subject matter, for an insert-only database, data can be organized in two major blocks: the main data area 410 and the delta data area 420. The main data area 410 can essentially remain constant (i.e., the data contained therein remains unchanged) while the new entries (insert only) can be written to the delta data area 420. Upon access, data from the main data area 410 and the delta data area 420 are considered for a query result. The rows are stored with a timestamp and the data is sorted increasingly in time, with the last insert the entry always being the last in the column. In one example, the access looking for a certain key commences looking from the latest entry takes the first match found (which is the latest). This way, an entry which had been overwritten is not found first, but the entry which overwrote (having the later time stamp) is found first. In another example, the main data area 410 can be changed in a manner such that the overwritten row is marked for deletion and deleted by a garbage collector module.

Periodically, a "merge" batch process can be started to merge the delta data area 410 into the main data area 420 (and collect the garbage in the main data area 420) to keep the delta data area 410 small and the main data area 420 containing most of the data.

For the content written by the upgrade, a second delta area is provided, namely the upgrade delta area 430. Inserts done by the upgrade can be written to this area (separated from the inserts written by the application program which can be written to delta data area 420).

This setup allows for writing upgrade entries during productive use of the system ensuring, the upgrade entries are not seen by the productively used application. The upgrade delta data area 430 can be used as "shadow content".

To create the final content, the delta data area 420 can be merged into the main data area 410 and afterwards the upgrade delta data area 430 can be merged into the main data area 410. The content is now up-to-date including the changes done by the system during the upgrade preparation (in the delta data area 420) and the upgrade import (in the upgrade delta data area 430).

The current subject matter allows for differentiation between the structure a user (i.e., consuming software application, etc.) sees within its context and the actual representation in memory (or on disk). This could be established by defining a user context and a DB catalog. Within the context, it can be defined, which DB catalog to use.

The database can enable, that for a certain context, a view is defined for a certain table, which has the same name (the application should not be required to change access from the table to the view) but shows only a subset of the columns of the table. The database can enable for views to be created within different DB catalogs, which are different within their structure. FIG. 5 illustrates a database catalog 510 that includes various catalogs/sub-catalogs which specify views on the table 230. For example Catalog S 520 provides a view on all columns of Table T 230, while Catalog S1 provides a view of a portion of the columns of table T 230 which correspond to the old view 210. Catalog S2 provides a different view of a portion of the columns of table T 230 which correspond to the new view 220.

Each database catalog can be used with multiple contexts. The following describes a process flow for a first example.
A context C1 is created.
A DB catalog S 520 is used for all the tables (e.g., Table T 230) in the database with their full representation within the database (all fields).
Within DB catalog S 520 the actual representation of the table T is described.
A context specific DB catalog S1 530 is created, and context C1 is configured to use catalog S1 530. All users using context C1 use DB catalog S1 530. Within this catalog S1 530, a view on T can be defined (note—this includes the same name on the table), which can be different from T which is defined in catalog S 520: The view on T in catalog S1 530 (referred to as S1.T) specifies, which columns of a table are seen, and how the columns are called.
Example:
S.T has fields (columns) F1, F2, F3
S1.T has only fields F1, F3
Map columns S1.T.F1 to S.T.F1, S1.T.F3 to S.T.F3.
Upon change if the structure of T in catalog S 520, the view in S1 shall only be affected, if a used column is affected. Upon adding a column to catalog S 520, catalog S1 530 shall still be usable, the same, if a column is dropped.
Later, another DB catalog S2 540 and another context C2 can be created.
This arrangement allows for changing a table structure with small overhead and low downtime.

In a second example, a table T 230 has columns A, B, C in the current version, and shall have columns A, B, D, E in the new version. A sample process for such an arrangement follows.
A new DB catalog is created: Catalog S2 540
All tables to be changed are looped over:
In catalog S 520 table T has fields A, B, C.
In the DB catalog S1 530 used by the users using context C1: S1, the view T has also fields A, B, C.
In DB catalog S10, the table T is extended by columns D and E (the obsolete field C is not yet dropped, see below).
A new view T is created in catalog S2 540, specifying to select columns A, B, D, E.
With this setup, the application software can continue to use the table T 230 with the known columns, while new columns can be added. New software (e.g. the upgrade software, etc.) can already access the new table structure. A stored procedure can be created to process the data in the table "in-place".
After the upgrade is complete,
DB catalog S1 530 can be deleted
This deletion includes deleting the view T in the catalog S1 530.
User contexts are instructed to subsequently use catalog S2 540.
The column C of table T in catalog S can be deleted.
Note—because C is not used in S2.T, this does not impact S2.T.
In a subsequent upgrade, DB catalog S3 is created, and so on.

To enable making a column broader, (e.g. extend from CHAR 8 to CHAR 10), a new column can be created (in memory, the column is a memory array, and making the rows in the array longer requires to re-allocate), and the data can be converted. A sample technique to support conversion for making columns broader is, to allow view in a DB catalog to define a column to be named differently is provided as follows.
S.T has fields F1, F2
S1.T has fields F1, F2 mapped to S.F1 and S.F2.
S.T is changed to add field F3 (column) F1, F2, F3
This enables during the upgrade to copy data from F2 to F3 (while the start release software sill operates on S1.T with fields F1 and F2 only.
For access to the new structure through application software (using DB catalog S2)
Catalog S2 is created, within a view T with fields F1 and F2
Map columns S2.T.F1 to S.T.F1 and S2.T.F2 to S.T.F3.
This would allow to do both: access the new structure in the new format with the correct field names (using catalog S1) and access the conversion program can use the complete structure (using catalog S).
This step is not necessarily required if all upgrade software can use catalog S (e.g. minimal application software is required to do the upgrade).
After the upgrade.
Columns S.T.F2 is dropped, column S.T.F3 is renamed to F2.
Catalog S2 is created/updated with a view T with fields F1 and F2
Map columns S2.T.F1 to S.T.F1 and S2.T.F2 to S.T.F2.
The queued conversion stored procedure can also be used for a database upgrade (e.g., schema change, etc.). For example, the database upgrade could comprise adding new fields and deleting certain other fields. Such a scenario can comprise:
A table T has columns A, B, C in the used version (i.e., the "old" version), and shall have columns A, B, D, E in the new version, where column d is computed out of A, B, C.
Current catalog used by users is S1, there the view T has fields A, B, C.
The DB catalog S contains table T which also has fields A, B, C. For the upgrade, table S.T is extended by columns D, E.
The catalog S2 is created
A DB catalog entry in S2 for view T is created with fields A, B, D, E (and S2.T.A=S.T.A, S2.T.E=S.T.E)
Now the stored procedure runs to fill columns D and E as a function of the columns A, B, C (and potentially other table columns).
Afterwards catalog S1 is deleted
Afterwards, column C is dropped
Upgrading the database can also comprise increasing a length of certain fields and changing field type. Such a scenario can comprise:
A table T has columns A, B, C in the used version, and shall have columns A, B, C in the new version, where column C is instead of char8 now char10.

Current catalog used by users is S1, there the view T has fields A, B, C.

The DB catalog S contains table T which also has fields A, B, C. For the upgrade, table S.T is extended by column D, which is of type char10 ("the new C").

The catalog S2 is created

A DB catalog entry in S2 for view T is created with fields A, B, C (and S2.T.A=S.T.A, S2.T.B=S.T.B, S2.T.C=S.T.D)

Now the stored procedure runs to fill D as a function of the column C.

Catalog S1 is deleted

S2.T is deleted

Column C is of S.T is dropped, column D is renamed to C.

S2.T is created as with fields A, B, C (and S2.T.A=S.T.A, S2.T.B=S.T.B, S2.T.C=S.T.C)

When an entry from the upgrade delta data area 430 overwrites entries in the old database written by a customer, it can occur, that a customer creates an entry in the delta data area 420 chronologically after the entry is written into the upgrade delta data area 430. To guarantee a consistent and deterministic behavior, it can be defined, that shipped entries "always overwrite customer data" or "never overwrite customer data" (however such issues do not arise when content is separated).

The timestamps of the entries in the delta data area 420 and the upgrade delta area 430 can be "mixed" in that it could be that entries in the delta data area 420 are newer and others are older than entries in the upgrade delta data area 430. To guarantee a deterministic merge, where the upgrade delta area 430 is always "winning" and has newer timestamps than the delta, during the merge of the upgrade delta area 430 into the main data area 410 (after the merge of the delta data area 420 into the main data area 410), the timestamps in upgrade delta area 430 can be incremented by an offset to ensure, they are newer than the entries in the main data area 410 at that point. Basically, such offset can be the difference of the timestamps used up by the delta data area 420. A sequence-counter can be used for the timestamps and upon the merge of upgrade delta area 430 and the main data area 410, the counters in the upgrade delta area 430 are increased by the offset.

The following describes an arrangement in which a shadow delta can be created.

A schema S2 is created.

DB catalog S and the tables in S are updated to get the new columns.

DB catalog S and the tables in S are updated to get a new column (a new name) with the new type and length for each column which needs to get a new type or length.

In schema S2, the new views are created.

For each column, which gets another type or length, the mapping is done as described above.

The stored procedures are created.

The stored procedures are started.

For a merge of delta data area 420 into main data area 410:

The stored procedures are suspended

The delta data area 420 and the main data area 410 are merged

The stored procedures are unsuspended

The upgrade delta data area 430 is created.

The upgrade data is deployed to the upgrade delta data area 430.

The downtime sequence can include:

Beginning situation is that each of the main data area 410, the delta data area 420, and the upgrade delta data area 430 exist.

The users are locked.

The stored procedures are stopped.

The delta data area 420 and the main data area 410 are merged

The DB catalog S1 (describing the user view of the main data area 410 after the delta data area 420 has been merged therein) can be dropped.

DB catalog S and the tables in S are updated, the superfluous columns are dropped.

DB catalog S and the tables in S are updated, the columns to be renamed are renamed.

The upgrade delta data area 430 and the main data area 410 are merged.

A new delta data area 420 is created.

The users are assigned to use DB catalog S2.

The users are un-locked.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A method for implementation by one or more data processors, the method comprising:
    enabling, by at least one data processor using a first view of a table, access to a column-based database having a plurality of columns, the first view of the table defining a first set of table fields encapsulating data within the table that is available for access;
    modifying, by at least one data processor, the table to include at least one shadow column that is not included in the first set of table fields;
    migrating, by at least one data processor, at least a portion of the data encapsulated in the first set of table fields to the at least one shadow column;
    generating, by at least one data processor, a second view of the table, the second view defining a second set of table fields encapsulating data within the table that is available for access, the second set of table fields including table fields in the at least one shadow column from which data from the first set of table fields was migrated; and
    enabling by at least one data processor, access to the database using the second view of the table,
    wherein the table accesses data from a second database comprising a main data area, a delta data area, and an upgrade delta area, at least a portion of data in the main data area and the delta data area and the upgrade delta area being merged such that some data in the delta data area overwrites corresponding data in the main data area and some data in the upgrade delta area overwrites corresponding data in the delta data area.

2. A method as in claim 1, wherein the second view of the table fields excludes table fields from which data was migrated.

3. A method as in claim 1, wherein the column-based database is an insert-only database.

4. A method as in claim 3, wherein the table comprises a plurality of entries each having a timestamp.

5. A method as in claim 4, wherein migrating at least a portion of the data encapsulated in the first set of table fields comprises:
    initiating, by at least one data processor, a procedure to iteratively advance through the entries in the table corresponding to the migrated data in a chronological order as specified by the corresponding timestamp and to compute, for each such entry, data to a field in the at least one shadow column based on data in a field in the first set of fields.

6. A method as in claim 5, wherein the procedure remains active until deleted or suspended.

7. A method as in claim 6, wherein the procedure advances through new entries within the first view in the table automatically upon the generation of each new entry.

8. A method as in claim 5, wherein the procedure only advances through entries in the main data area and the delta data area.

9. A method as in claim 8, wherein the main data area comprises data entries up to a first timestamp and wherein the delta data area comprises data entries having timestamps subsequent to the first timestamp.

10. A method as in claim 9, wherein the upgrade delta area comprises entries written by the procedure.

11. A method as in claim 10, wherein the delta data area is firstly merged into the main data area and the upgrade delta area is secondly merged into the main data area such that superfluous columns in the merged area are removed.

12. A method as in claim 11, wherein the entries written by the procedure in the upgrade delta area are assigned timestamps that include an offset so that such entries have timestamps more recent than timestamps of entries in the delta data area.

13. A method as in claim 1, wherein the at least one shadow column is used to broaden a column within the first view of the table to include at least one additional character.

14. An article of manufacture comprising:
    computer executable instructions stored on a non-transitory computer readable media, which, when executed by a computer, causes the computer to perform operations comprising:
        enabling access to a column-based insert-only database having a plurality of columns using a first view of a table, the first view of the table defining a first set of table fields encapsulating data within the table that is available for access;
        modifying the table to include at least one shadow column that is not included in the first set of table fields, the shadow column being a hidden column;
        migrating at least a portion of the data encapsulated in the first set of table fields to the at least one shadow column;
        generating a second view of the table, the second view defining a second set of table fields encapsulating data within the table that is available for access, the second set of table fields including table fields in the at least one shadow column from which data from the first set of table fields was migrated; and
    enabling access to the database using the second view of the table,
    wherein the table accesses data from a second database comprising a main data area, a delta data area, and an upgrade delta area, at least a portion of data in the main data area and the delta data area and the upgrade delta area being merged such that some data in the delta data area overwrites corresponding data in the main area and some data in the upgrade delta area overwrites corresponding data in the delta data area.

15. An article as in claim 14, wherein the table comprises a plurality of entries each having a timestamp, wherein migrating at least a portion of the data encapsulated in the first set of table fields comprises:
    initiating a procedure to iteratively advance through the entries in the table corresponding to the migrated data in a chronological order as specified by the corresponding timestamp and to compute, for each such entry, data to a field in the at least one shadow column based on data in a field in the first set of fields.

16. An article as in claim 15, wherein the procedure remains active until deleted or suspended; and wherein the procedure advances through new entries within the first view in the table automatically upon the generation of each new entry.

17. An article as in claim 16, wherein the table comprises a main data area, a delta data area, and an upgrade delta area;

wherein the procedure only advances through entries in the main data area and the delta data area; wherein the main data area comprises data entries up to a first timestamp and wherein the delta data area comprises data entries having timestamps subsequent to the first timestamp; wherein the upgrade delta area comprises entries written by the procedure.

18. An article as in claim 17, wherein the delta data area is firstly merged into the main data area and the upgrade delta area is secondly merged into the main data area; wherein the entries written by the procedure in the upgrade delta area are assigned timestamps that include an offset so that such entries have timestamps more recent than timestamps of entries in the delta data area.

19. An article as in claim 14, wherein the at least one shadow column is used to broaden a column within the first view of the table to include at least one additional character.

20. A method for implementation by one or more data processors, the method comprising:

adding, by at least one data processor, at least one column to a table in a column-based database, the table having a plurality of columns and table fields, the database accessing data from a second database comprising a main data area and a delta data area and an upgrade delta area, at least a portion of data in the second database being merged such that some data in the delta data area overwrites corresponding data in the main area and some data in the upgrade delta area overwrites corresponding data in the delta data area;

performing, by at least one data processor, a shadow-in-place upgrade of the column-based database, the upgrade adding at least one new column to the database; and seamlessly enabling access, by at least one data processor, to the column-based database before, during, and after the upgrade through a plurality of views, the views defining that a subset of the fields in the database are visible.

* * * * *